United States Patent [19]
Weiss

[11] Patent Number: 5,821,983
[45] Date of Patent: Oct. 13, 1998

[54] DATA MESSAGE STORAGE AND TRANSMISSION USING A VIDEOPHONE AND SMART CARD

[75] Inventor: Michael Joseph Weiss, East Brunswick, N.J.

[73] Assignee: Lucent Technologies, Inc., Murray Hil, N.J.

[21] Appl. No.: 851,557

[22] Filed: May 5, 1997

Related U.S. Application Data

[63] Continuation of Ser. No. 246,545, May 20, 1994, abandoned.

[51] Int. Cl.$^6$ .................................................... H04N 7/14
[52] U.S. Cl. .......................... 348/14; 235/451; 379/93.17
[58] Field of Search ..................... 348/13–20; 379/93.17, 379/93.21, 93.23, 93.01, 91.01, 355, 356, 357; 235/451, 379, 380

[56] References Cited

U.S. PATENT DOCUMENTS

| | | | |
|---|---|---|---|
| 4,480,178 | 10/1984 | Miller, II et al. | 235/380 |
| 4,485,400 | 11/1984 | Lemelson et al. | 348/14 |
| 4,715,059 | 12/1987 | Cooper-Hart et al. | 348/14 |
| 4,816,653 | 3/1989 | Anderl et al. | 235/380 |
| 4,888,773 | 12/1989 | Arlington et al. | 371/40.2 |
| 4,901,160 | 2/1990 | Kinoshita et al. | 379/93 |
| 4,904,853 | 2/1990 | Yokokawa | 235/487 |
| 4,943,868 | 7/1990 | Yoshinaga et al. | 358/403 |
| 5,020,957 | 6/1991 | Serrao | 348/14 |
| 5,046,079 | 9/1991 | Hashimoto | 348/14 |
| 5,065,429 | 11/1991 | Lang | 380/25 |
| 5,120,939 | 6/1992 | Claus et al. | 235/382 |
| 5,191,601 | 3/1993 | Ida et al. | 348/14 |
| 5,191,611 | 3/1993 | Lang | 380/25 |
| 5,193,114 | 3/1993 | Moseley | 380/23 |
| 5,283,826 | 2/1994 | Kurosawa et al. | 379/357 |
| 5,335,276 | 8/1994 | Thompson et al. | 379/357 |
| 5,376,965 | 12/1994 | Nagasaki et al. | 348/233 |
| 5,404,000 | 4/1995 | Nair et al. | 235/451 |
| 5,414,457 | 5/1995 | Kadowaki et al. | 379/355 |
| 5,442,718 | 8/1995 | Kobayashi et al. | 382/166 |

FOREIGN PATENT DOCUMENTS

| | | |
|---|---|---|
| 0535960 | 4/1993 | European Pat. Off. . |
| 0570062 | 11/1993 | European Pat. Off. . |
| 4228692 | 1/1993 | Germany . |
| 9400936 | 1/1994 | WIPO . |

OTHER PUBLICATIONS

P. V. Rangan, "Video Conferencing, File Storage, and Management in Multimedia Computer Systems", Computer Networks and ISDN Systems, vol. 25, No. 8, Mar. 1, 1993, pp. 901–919.

*Primary Examiner*—Stella Woo
*Attorney, Agent, or Firm*—Hedman, Gibson & Costigan, P.C.

[57] ABSTRACT

A smart card, a non-passive, secure, microprocessor based data storage medium, is used for the storage of a plurality of data messages and is read by a video telephone terminal equipped with a smart card reader to provide transmission of a data message, comprising video image data, either in still frame or full motion format, to a remote video telephone terminal. The use of the smart card for storage of a data message provides a secure, transportable message that is available for transmission from any video telephone terminal having smart card reading capability.

22 Claims, 4 Drawing Sheets

DATA MESSAGE STORAGE AND TRANSMISSION USING A VIDEOPHONE AND SMART CARD

This application is a continuation of Ser. No. 08/246,545 filed May 20, 1994 now abandoned.

FIELD OF THE INVENTION

This invention relates to the use of a device, having its own microprocessor, memory (comprising a video image) and input/output (I/O) circuitry, as a data storage medium for use with video telephone units having compatible data storage reading capability.

BACKGROUND OF THE INVENTION

Smart cards are non-passive data storage devices which comprise a microprocessor, memory and I/O circuitry. Smart cards are generally used when a secure and portable means to store data is desired. There are "contactless" smart cards which do not require physical contact to transfer data between the card and a card reader and there are smart cards which have electrical contacts to facilitate such data transfer. Prior art U.S Pat. No. 4,480,178 describes a contactless smart card and U.S. Pat. No. 5,120,939 describes the security which smart cards provide when used as data memory devices.

Video telephones are used in communication systems to provide a two-way audio and video communications link. In general, a video telephone (videophone) uses a video camera in conjunction with a video display unit, a hands-free speakerphone, and a telephone interface. U.S. Pat. No. 4,715,059 describes a microprocessor based videophone wherein the defined hardware is suited for general use in a videophone communications network. A problem arises when a user of a videophone does not wish to have his/her video image sent to another terminal, for instance when one is just waking. Additionally, the normal image transmission process becomes problematic when a party attempts to locate an illustration before the video camera of his/her videophone, during a conversation with another party, in an effort to center the image which is subsequently presented.

SUMMARY OF THE INVENTION

The present invention is directed to the use of a video telephone unit equipped with a smart card reader which accepts a smart card having data comprising a video image thereon. A plurality of video image data (data messages), either in still frame or full motion format, are stored on the small, secure and portable smart card. The plurality of user defined data messages may then be presented to another videophone terminal at any time and for any duration pursuant to the user's discretion. The data messages are transferred to the smart card through any number of techniques, with the use of a camera and related hardware of the user's videophone being preferred.

DESCRIPTION OF THE DRAWING

The invention can be better understood when considered with the following drawings wherein.

DETAILED DESCRIPTION OF THE PREFERRED EMBODIMENT

Figure 1:
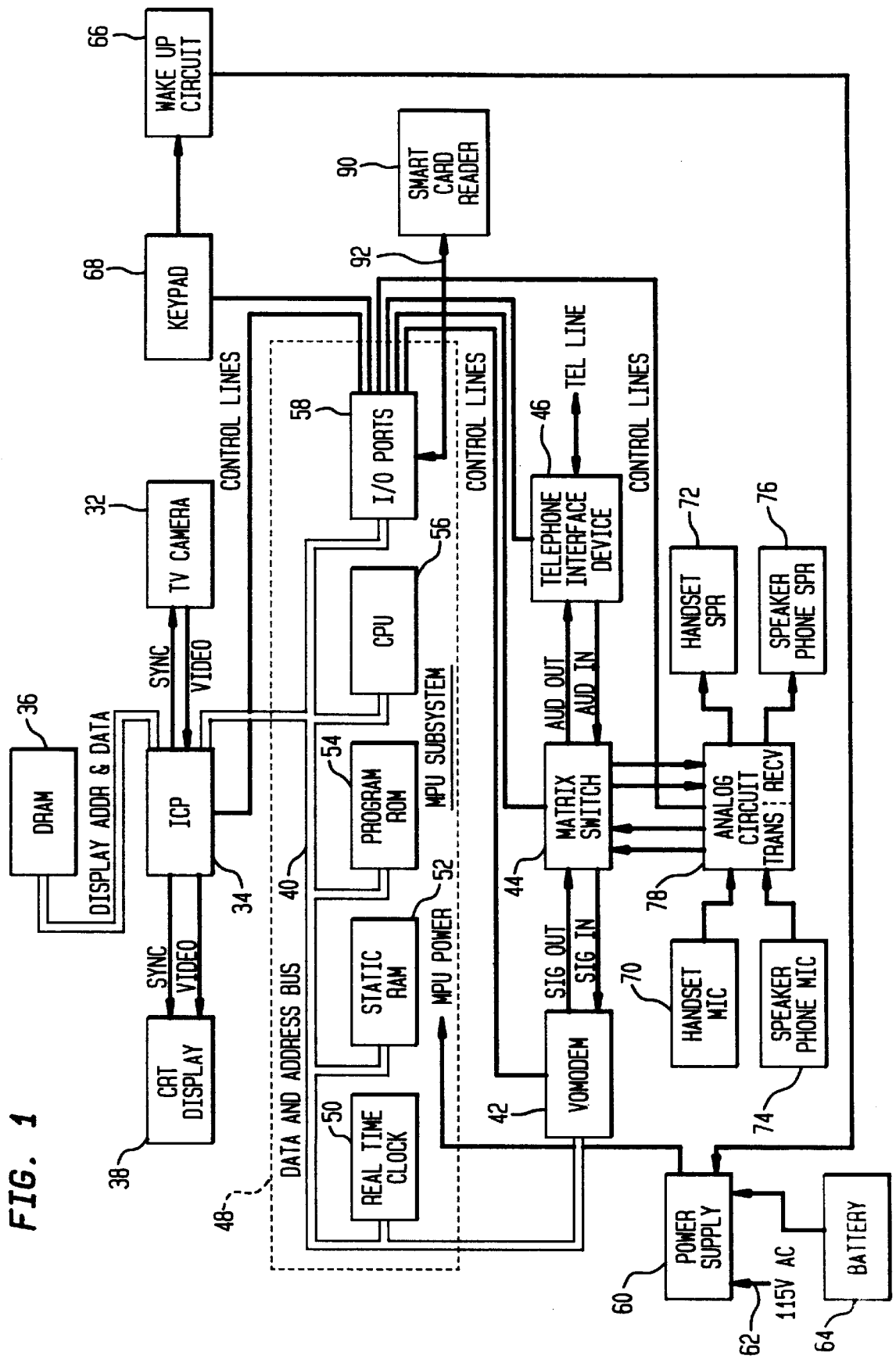
FIG. 1 is a hardware block diagram of the preferred video telephone employing a smart card reader of the present invention.

FIG. 1 shows a block diagram of a videophone comprising a microprocessor 48, TV camera 32, CRT display 38, modem 42, matrix switch 44 and telephone interface device 46.

The TV camera 32 is used to capture video image data of the telephone user. The video image data from camera 32 are fed to an image control processing (ICP) circuit 34. ICP circuit 34 is a standard video display processor with additional circuitry for digitizing the video image data. The video display processor portion contains the video sync generator and a system timing circuit for generating all the system clocks. Processing circuit 34 digitizes the video data from camera 32 and stores the resultant data in dynamic RAM 36.

Processing circuit 34 also retrieves the data from RAM 36 and converts the data into analog form by means of a digital to analog (D/A) converter in circuit 34. The analog values are then fed to a cathode ray tube (CRT) display 38 to display the video image. Processing circuit 34 additionally transfers data from RAM 36 to a microprocessor bus 40 from which it is fed to a video optimized modem 42. The modem 42 operates to modulate a carrier signal with the video image data and feed the signal through a matrix switch 44 to a telephone interface circuit 46 for transmission to a remote videophone via the telephone line.

The operation of the videophone is controlled by a microprocessor unit 48 which includes a clock 50, a static RAM 52, a ROM 54, a central processing unit (CPU) 56, and input/output ports 58. The microprocessor 48 is powered by a power supply 60 which is fed by the 115 volt A/C line voltage 62 with a battery backup 64. In order to conserve battery power, the power supply is actuated by a wake up circuit 66. The wake up circuit 66 is controlled by a keypad 68 on the videophone. If line power is used, the wake up circuit 66 is automatically bypassed.

The videophone also includes normal telephone audio circuits for transmission of voices including a handset microphone 70 and a handset speaker 72 as well as a speaker phone microphone 74 and a speaker phone speaker 76. The microphones and speakers 70, 72, 74, and 76 are coupled through an analog circuit 78 to a matrix switch 44 for connection through the interface 46 to the telephone line.

The matrix switch 44 is under the control of the microprocessor unit 48 and provides appropriate paths for signals to and from the interface circuit 46, modem 42, and analog circuit 78. The interface circuit 46 includes a duplexer, a programmable line impedance matching network, a delay equalizer, a ring detect circuit, a line protection circuit, a loop current circuit, and a hook switch relay.

During operation, the analog circuit 78 receives audio signals from the handset and speaker phone microphones 70, 74 and amplifies these signals. The audio signals are fed through the matrix switch 44 and interface circuit 46 and then transmitted, via the telephone line, to the remote terminal. The analog circuit 78 also amplifies audio information received from a remote user and applies the amplified signals to the handset speaker 72 or speaker phone speaker 76.

The microprocessor unit 48 is also used to expand the capabilities of the videophone. A static RAM 52 is used to store directory information or other data utilized by a program stored in the program ROM 54. The microprocessor unit 48 further enables the videophone to utilize either pulse or tone dialing. A battery 64 ensures that information in static RAM 52 is retained when A/C power is not applied. The ICP circuit 34 operates to process data from the microprocessor unit 48 and display such data as graphics or alphanumerics on the CRT 38.

A smart card reader 90 is coupled via a digital serial interface 92 to the I/O port 58. The smart card reader 90 comprises a data I/O interface (not shown) which is coupled to the data I/O interface 106 of the smart card when inserted therein. Thus the active functions and memory data of the smart card 108 are accessible to the videophone microprocessor 48. Similarly, the active functions and memory data of the videophone microprocessor 48 are accessible to the smart card 108.

Figure 2:
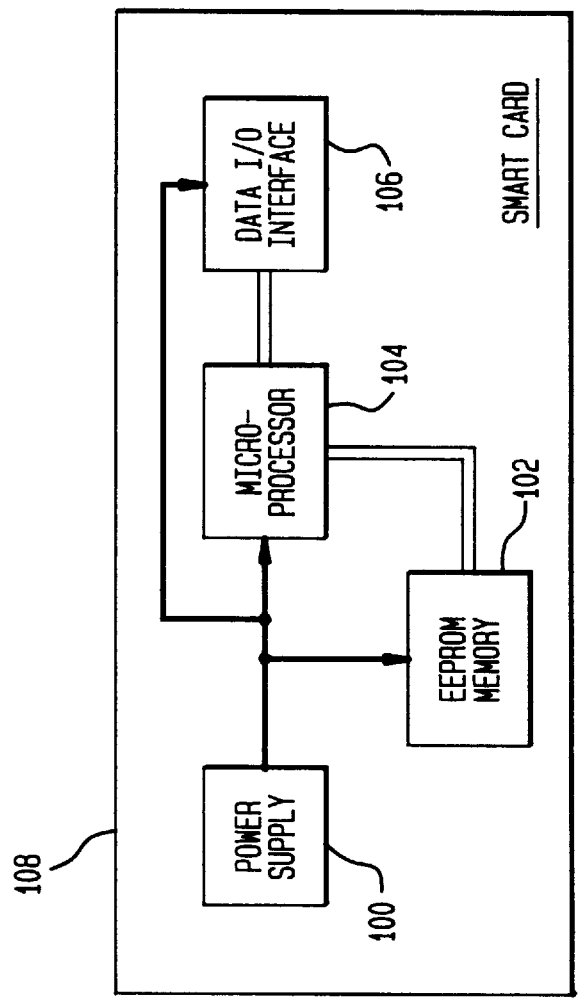
FIG. 2 is a block diagram of a smart card of the present invention.

FIG. 2 shows a block diagram of a smart card 108 suitable for use in the present invention. The smart card has a microprocessor 104, a power supply 100, an EEPROM memory 102 and a data I/O interface 106.

The microprocessor 104 is used in providing active functions on the smart card 108 independent of outside control, making the smart card 108 a stand alone data processing unit capable of selectively limiting access thereto. The power supply 100 provides a rectified DC voltage which biases the smart card circuitry and the EEPROM memory 102 is used to store data generated by the microprocessor 104 or input through the data I/O interface 106.

A preferred style of data I/O interface, for the smart card 108 and the smart card reader 90, is described in detail in U.S. Pat. No. 4,480,178 wherein the data I/O interface 106 utilizes an automatic tuning circuit to insure continuous maximum transfer of energy from the smart card reader 90 to the smart card 108 via a capacitive coupling arrangement. This arrangement comprises metallic plates with outer dielectric surfaces on the smart card 108 and the smart card reader 90 which are formed when the smart card 108 is inserted in the smart card reader 90. Thus the interface between the smart card 108 and the smart card reader 90 does not require the physical contact of conductive materials to facilitate the transfer of data therebetween. In the transfer of energy to the smart card 108, the reader 90 generates a high frequency signal which transfers the energy through the contactless, capacitively coupled surfaces.

In general, the smart card 108 is the size of a standard credit card and resembles same. Several companies are developing and manufacturing smart cards including AT&T of the U.S. and GEM of the United Kingdom. Both the AT&T "EXPEDITOR" smart card and the "5B" smart card reader are of the contactless variety and are well suited for use in the present invention.

The mutual access of function plus memory between the smart card 108 and the microprocessor 48 of the video telephone facilitates the secure transfer and storage of data messages which are used to greet or inform various parties using video telephones.

A data message is any user defined message which has been at least partially stored in the EEPROM 102 of the smart card 108. The data message, or a portion thereof, is stored in the EEPROM 102 of the smart card 108 using any of a plurality of methods. The preferred method uses the TV camera 68 of the video telephone to capture video image data, the speakerphone speaker 76 to capture audio track data and the RAM 52 and/or 36 to store same. The CPU 56 then transfers the data message, comprised of the video image data and the audio track data (multi-media data message), to the smart card 108 through the I/O port 58 and the smart card reader 90.

It is noted that the format of the video image portion of the data message can be a still image or a full motion image depending on the capabilities of the hardware and the desires of the user. The presently described embodiment comprises a hardware system which can support either format of video image.

Figure 3:
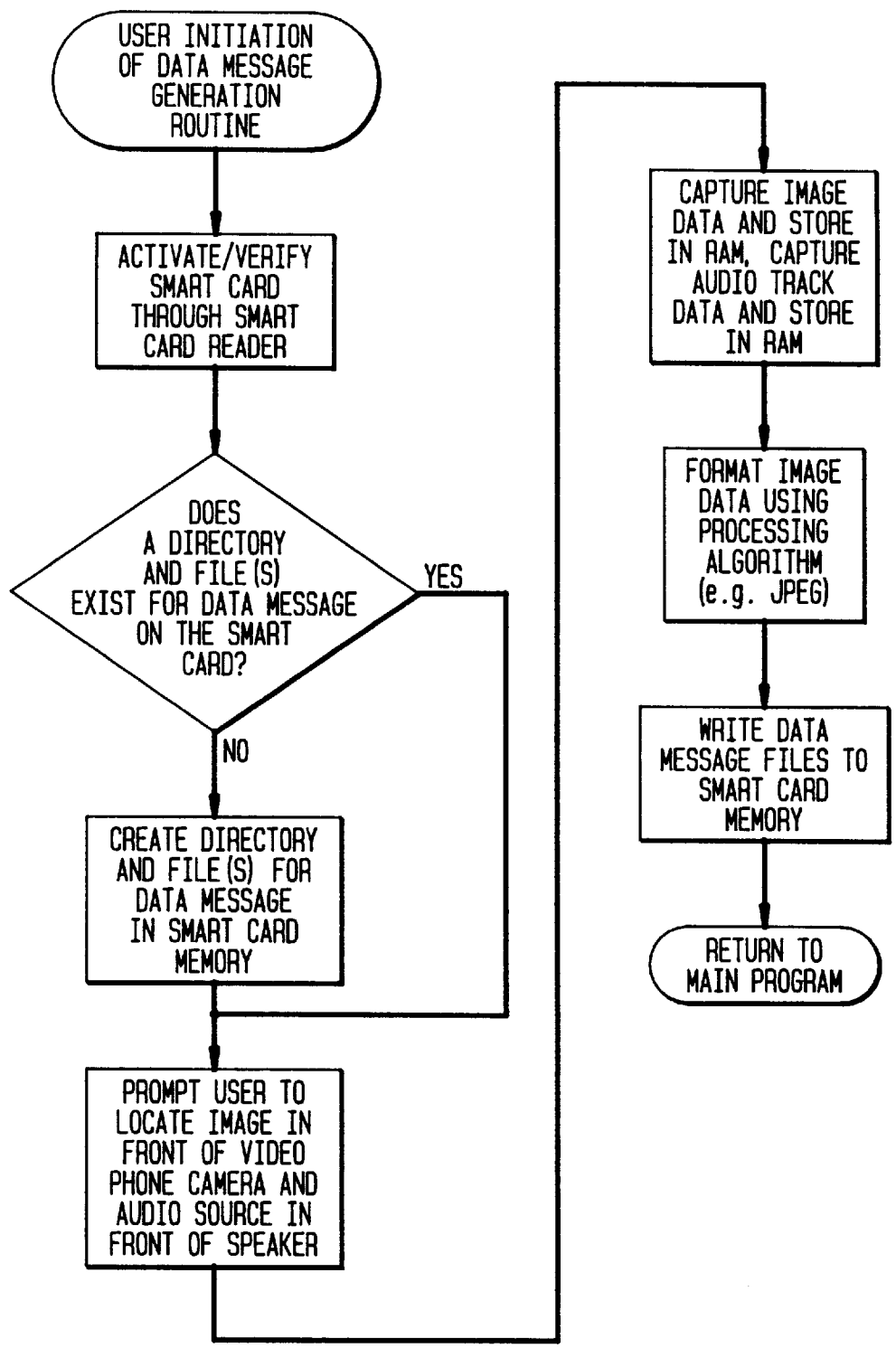
FIG. 3 is a software flow diagram showing the steps required to generate and store a data message on a smart card of the present invention.

FIG. 3 shows a software flow diagram which defines the process by which a multi-media data message may be generated using the TV camera 32 and speakerphone speaker 76 of the video telephone and stored on the smart card 108. A user initiates a data message generation subroutine of the main software program of the videophone microprocessor 48 by depressing a special button designated for data message generation.

Once the data message generation subroutine is initiated, the microprocessor ensures that a smart card 108 is inserted in the smart card reader 90. A verification routine is executed (prompting the user for a password or PIN number if necessary) to ensure the security of the data stored on the smart card 108. If the smart card 108 is being used to store a data message for the first time (no previous data message file exists), the microprocessor 48 of the videophone and the microprocessor 104 of the smart card 108 will create a data message file directory and data message file(s) which will initially be empty.

When a still frame video image data message is desired, only one data message file is created. However, when a full motion video image data message is desired, several data message files are generated (or sections of one data message file are generated) which store the full motion data message.

The data message generation subroutine next prompts the user to locate the desired image or sequence of images in front of the TV camera 32 of the videophone and the audio source in front of the speakerphone speaker 76. The captured video image data and audio track data are temporarily stored in RAM 52 and/or 36 of the videophone.

When the storage capability of the EEPROM memory 102 of the smart card 108 is not large enough to store the raw data of the captured video image data and audio track data stored in RAM 52 and/or 36 of the videophone, a video image data processing algorithm must be employed. A preferred processing algorithm for still frame data messages is Joint Photographic Experts Group (JPEG) which compresses the video image data with a resultant decrease in the quantity of memory required to store a data message on the smart card 108. JPEG is a well known technique which generates a data sequence, representing a particular video image, which may be arbitrarily compressed as video image quality is sacrificed. Motion Picture Experts Group (MPEG) is a preferred processing algorithm for full motion data messages.

The video image data and audio track data are written to the EEPROM memory 102 of the smart card 108 through the I/O port 58 and the smart card reader 90 and remain secure on the smart card 108 as long as the user wishes. Additionally, the data message is portable to any videophone which has a smart card reader thus facilitating the presentation of a personalized data message, in accordance with the smart card 108, regardless of the location or ownership of the videophone.

Figure 4:
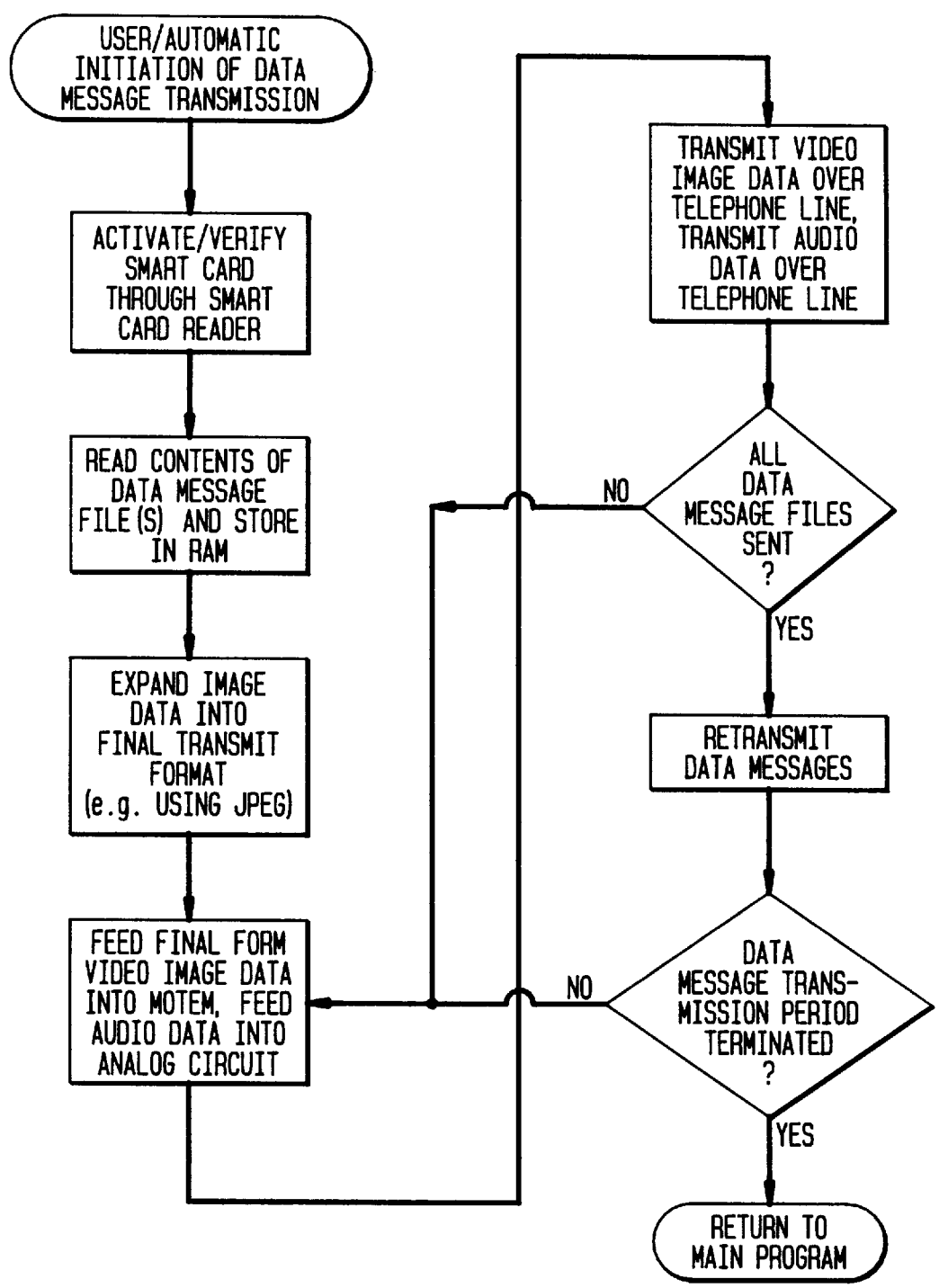
FIG. 4 is a software flow diagram showing the steps required to retrieve the data message from the smart card and transmit the data message of the present invention.

When the use of the smart card 108 is desired, it is inserted into the smart card reader 90, and the data message is transmitted, via the telephone line, to a remote videophone terminal for presentation. FIG. 4 shows a software flow diagram defining the process by which a data message may be retrieved from the smart card 108 and transmitted to the videophone of another user. The data message retrieval and transmission is user initiated or automatic depending on the predefined program of the videophone unit accepting the smart card 108.

Once the retrieval subroutine is initiated, an activation/verification routine, similar to the aforementioned verification routine of the data message generation subroutine, is started. The contents of the data message file(s) are read into RAM 52 and/or 36 of the videophone through the smart card reader 90 and the I/O port 58.

When the data message is of the still frame format, only the one data message file is retrieved. The video image data, of the data message file, is expanded according to the JPEG data processing algorithm and then transferred to the modem 42. The video image data are transmitted by the telephone interface device 46 to a remote videophone for display, via the telephone line. Coincidently or subsequently, the audio track data are transferred to the analog circuit 78 and transmitted, via the telephone line, for presentation from the remote videophone. The data message file is re-transmitted until the user manually signals a completion of data message transmission or until the main program of the videophone automatically interrupts the data message transmission for live data transmission.

For full motion data message transmission, all pertinent data message files (or sections of a single file) are expanded using the JPEG algorithm and, rather than retransmitting the same data message, the next data message file (or section of a single file) is transferred from RAM 52 and/or 36 to the modem 42. The video image data are transmitted by the telephone interface 46, via the telephone line, to the remote videophone. Coincidently or subsequently, the audio track data are transferred from the RAM 52 and/or 36 to the analog circuit 78 and transmitted, via the telephone line, to the remote videophone.

The sequencing of the images produced by the transmission of the video image data and their subsequent display produces the appearance of full video motion. The sequence of video image data and audio track data are then re-transmitted until the user manually signals the completion of data message transmission or the main program of the videophone automatically interrupts the data message transmission for live data transmission. Control then returns to the main program of the videophone for further instruction.

The flexibility which the microprocessor 48 provides may lead one, skilled in the art, to add several functions to the invention described heretofore. For example, since available memory is the only limit to the number of distinct data messages which may be stored on the smart card 108, the program may prompt the user to select any of the plurality of resident data messages for transmission to the remote videophone. The program may also automatically or manually transmit a sequence of user-defined data messages which reside, at least in part, on the smart card 108. Additionally, the program may provide for overriding any functions of the user's choice such as the automatic interruption of data message re-transmission.

Another adaptation of the present invention is the use of the data message, comprising video image data, stored on the smart card 108 as an outgoing greeting message of a videophone answering machine. Videophone answering machines are known in the art to provide a means for recording a video image and audio track of a calling party and subsequent reproduction of the video image and audio track when requested by the called party. The present invention may be adapted to produce an outgoing greeting by triggering the transmission of the data message(s) after a telephone interface device of the videophone answering machine has detected a connection between the videophone of the calling party and the videophone answering machine of the called party. After the outgoing message has been transmitted, the videophone answering machine records the incoming message of the calling party. U.S. Pat. No. 5,046,079 describes a videophone answering machine which is suited for adaptation of the present invention.

Thus, in accordance with this invention, a small, secure and portable means of storing at least one data message, either of still frame or full motion format, is used to transfer a user's data message to a videophone terminal to present a personalized data message to a remote videophone.

The foregoing description of the preferred embodiment of the invention has been presented for the purposes of illustration and description. It is not intended to be exhaustive or to limit the invention to the precise form disclosed. Modifications and variations are possible in light of the above teaching. It is intended that the scope of the invention be not limited by this detailed description, but rather by the claims appended hereto.

The following patents are hereby incorporated into this patent specification by reference: U.S. Pat. No. 4,480,178; U.S. Pat. No. 4,715,059; and U.S. Pat. No. 5,120,939.

I claim:

1. A method for remotely displaying a data message on a remote microprocessor based video communications device comprising the steps of:

generating said data message comprising a video image;

storing at least a portion of said data message as a stored data message on a microprocessor based data storage device, wherein said microprocessor based data storage device comprises microprocessing means for controlling data transfer, providing data manipulation functions and providing security for a stored data message, data message memory means for storing the data message, data I/O interface means for transferring said data message between a data storage device reader and said microprocessor based data storage device, said microprocessor based storage device comprising a smart card, said smart card comprising a contactless capacitively coupled data I/O interface means and an internal, independent power supply;

retrieving said stored data message using data storage reading means associated with a first microprocessor based video communications device;

transmitting said data message using said first microprocessor based video communications device to said remote microprocessor based video communications device; and displaying said data message on said remote microprocessor based video communications device.

2. The method for remotely displaying said data message as defined in claim 1, wherein said first microprocessor based video communications device comprises:

microprocessor means for controlling data transfer and providing data manipulation functions;

memory means for storing data;

data storage reader means comprising I/O interface means for transferring at least a portion of said data message between the memory means of the first microprocessor based data video communication device and said microprocessor based data storage device;

communications interface means for transmitting data to and receiving data from said remote microprocessor based video communications device; and video image capturing means for capturing a video image for generation of said data message.

3. The method for remotely displaying said data message as defined in claim 2, wherein said communications interface means of said first microprocessor based video communications device comprises a telephone line interface circuit for providing data transmission via a telephone line.

4. The method for remotely displaying said data message as defined in claim 2, wherein said first microprocessor based video communications device is comprised of a videophone comprising a smart card reader.

5. The method for remotely displaying said data message as defined in claim 1, wherein storing at least a portion of said data message further comprises the steps of:

initiating a data message generation routine;

creating at least one data message file in a data message memory means of said first microprocessor based data storage device;

generating said data message;

storing at least a portion of the data message in the memory means of said first microprocessor based video communications device;

transferring at least a portion of the data message from said memory means of said first microprocessor based video communication device to an I/O interface means of the first microprocessor based video communication device;

transferring at least portion of the data message from the I/O interface means of said microprocessor based video communications device to the I/O interface means of said microprocessor based data storage device; and writing said data message in said data message memory means.

6. The method for remotely displaying said data message as defined in claim 5, wherein said method comprises the additional step of processing said data message using a data processing algorithm prior to transferring said data message to the I/O interface means of the first microprocessor based video communications device.

7. The method for remotely displaying said data message as defined in claim 6, wherein said data processing algorithm is JPEG.

8. The method for remotely displaying said data message as defined in claim 6, wherein said data processing algorithm is MPEG.

9. The method for remotely displaying said data message as defined in claim 1, wherein said microprocessor based data storage device comprises microprocessing means for controlling data transfer, providing data manipulation functions and providing security for said stored data message; memory means for storing the data message; and data I/O interface means for transferring said data message between a data storage device reader and said microprocessor based data storage device, and wherein said first microprocessor based video communications device comprises microprocessor means for controlling data transfer and providing data manipulation functions; memory means for storing data; data storage reader means comprising I/O interface means for transferring at least a portion of said data message between the memory means of the first microprocessor based video communications device and said microprocessor based storage data device; communication interface means for transmitting data to and receiving data from said remote microprocessor based video communication devices; and video image generation means for generating a video image and generating said data message, said method further comprising the steps of:

reading at least a portion of said data message, from said microprocessor based data storage device using both I/O interface means of said microprocessor based data storage device and said data storage reader means of said first microprocessor based video communications device;

storing said data message in said memory means of the first microprocessor based video communications device;

transferring said data message to the communications interface means of the first microprocessor based video communications device;

transmitting said data message to said remote microprocessor based video communications device; and presenting said data message on said remote microprocessor based video communication device.

10. The method for remotely displaying said data message as defined in claim 9, wherein said method comprises the additional step of processing said data message using a data processing algorithm prior to transferring said data message to the communications interface means of the first microprocessor based video communications device.

11. The method for remotely displaying said data message as defined in claim 10, wherein said data processing algorithm is JPEG.

12. The method for remotely displaying said data message as defined in claim 10, wherein said data processing algorithm is MPEG.

13. The method for remotely displaying said data message as defined in claim 1, wherein the first microprocessor based video communications device comprises a video camera and the step of generating said data message comprises using said video camera to capture a visual image.

14. The method for remotely displaying said data message as defined in claim 13, wherein the first microprocessor based video communications device comprises a microphone and the step of generating said data message further comprises using said microphone to capture audio track data.

15. The method for remotely displaying said data message as defined in claim 1, wherein said method further comprises the step of re-transmitting said data message to said remote microprocessor based video communications device at the end of the initial data message transmission.

16. The method for remotely displaying said data message as defined in claim 1, wherein said method further comprises the step of manually terminating the data message transmission by users intervention.

17. The method for remotely displaying said data message as defined in claim 1, wherein said process further comprises the step of automatically terminating the transmission of said data message after a predetermined period has elapsed.

18. A method for remotely displaying a data message on a remote microprocessor based video communications device comprising the steps of :

generating a data message comprising a video image;

storing at least a portion of said data message as a stored data message on a microprocessor based data storage device, wherein said microprocessor based data storage device comprises microprocessing means for controlling data transfer, providing data manipulation functions and providing security for a stored data message, data message memory means for storing the data message, said data message memory means coupled to a data storage device reader by a digital interface, data I/O interface means for transferring said data message between said data storage device reader and said microprocessor based data storage device, said microprocessor based storage device comprising a smart card, said smart card comprising a contactless capacitively coupled data I/O interface means and an internal, independent power supply;

retrieving said stored data message using data storage reading means associated with the first microprocessor based video communications device;

transmitting said data message using said first microprocessor based video communications device to said remote microprocessor based video communications device; and displaying said data message on said remote microprocessor based video communications device.

19. A method for remotely displaying a data message on a remote microprocessor based video communications device comprising the steps of:

generating said data message comprising a video image;

storing at least a portion of said data message as a stored data message on a microprocessor based data storage device, wherein said microprocessor based data storage device comprises microprocessing means for controlling data transfer, providing data manipulation functions and providing security for a stored data message, data message memory means for storing the data message, data I/O interface means for transferring said data message between a data storage device reader and said microprocessor based storage device comprising a smart card, said smart card comprising a contactless capacitively coupled data I/O interface means and an automatic tuning circuit;

retrieving said stored data message using data storage reading means associated with a first microprocessor based video communications device;

transmitting said data message using said first microprocessor based video communications device to said remote microprocessor based video communications device; and displaying said data message on said remote microprocessor based video communications device.

20. A method for remotely displaying a data message on a remote microprocessor based video communications device comprising of the steps of:

generating said data message comprising a video image;

storing at least a portion of said data message as a stored data message on a microprocessor based data storage device, wherein said microprocessor based data storage device comprises microprocessing means for controlling data transfer, providing data manipulation functions and providing security for a stored data message, data message memory means for storing the data message, data I/O interface means for transferring said data message between a data storage device reader and said microprocessor based data storage device, said microprocessor based storage device comprising a smart card, said smart card comprising a contactless capacitively coupled data I/O interface means, an independent, internal power supply and an automatic tuning circuit;

retrieving said stored data message using data storage reading means associated with a first microprocessor based video communications device;

transmitting said data message using said first microprocessor based video communications device to said remote microprocessor based video communications device; and displaying said data message on said remote microprocessor based video communications device.

21. A method for remotely displaying a data message on a remote microprocessor based video communications device comprising the steps of:

generating a data message comprising a video image;

storing at least a portion of said data message as a stored data message on a microprocessor based data storage device, wherein said microprocessor based data storage device comprises microprocessing means for controlling data transfer, providing data manipulation functions and providing security for a stored data message, data message memory means for storing the data message, said data message memory means coupled to a data storage device reader by a digital interface, data I/O interface means for transferring said data message between said data storage device reader and said microprocessor based data storage device, said microprocessor based storage device comprising a smart card, said smart card comprising a contactless capacitively coupled data I/O interface means and an automatic tuning circuit;

retrieving said stored data message using data storage reading means associated with a first microprocessor based video communication device;

transmitting said data message using said first microprocessor based video communications device to said remote microprocessor based video communications device; and displaying said data message on said remote microprocessor based video communication device.

22. A method for remotely displaying a data message on a remote microprocessor based video communications device comprising the step of:

generating a data message comprising a video image;

storing at least a portion of said data message as a stored data message on a microprocessor based data storage device, wherein said microprocessor based data storage device comprises microprocessing means for controlling data transfer, providing data manipulation functions and providing security for a stored data message, data message memory means for storing the data message, said data message memory means coupled to a data storage device reader by a digital interface, data I/O interface means for transferring said data message between said data storage device reader and said microprocessor based data storage device, said microprocessor based storage device comprising a smart card, said smart card comprising a contactless capacitively coupled data I/O interface means, an internal, independent power supply and an automatic tuning circuit;

retrieving said storage data message using data storage reading means associated with a first microprocessor based video communications device;

transmitting said data message using said first microprocessor based video communications device to said remote microprocessor based video communications device; and displaying said data message on said remote microprocessor based video communications device.

* * * * *